US008865783B2

(12) United States Patent
Gelmont et al.

(10) Patent No.: US 8,865,783 B2
(45) Date of Patent: Oct. 21, 2014

(54) FLAME RETARDANT COMPOSITION

(75) Inventors: Mark Gelmont, Haifa (IL); Michael Peled, Beer-Sheva (IL); Dina Alon, Karmiel (IL); Ron Frim, Haifa (IL); Yoav Bar-Yaakov, Lehavim (IL)

(73) Assignee: Bromine Compounds Ltd., Be'er-Sheva (IL)

( * ) Notice: Subject to any disclaimer, the term of this patent is extended or adjusted under 35 U.S.C. 154(b) by 578 days.

(21) Appl. No.: 12/227,371

(22) PCT Filed: May 14, 2007

(86) PCT No.: PCT/IL2007/000589
§ 371 (c)(1),
(2), (4) Date: Jul. 8, 2009

(87) PCT Pub. No.: WO2007/132463
PCT Pub. Date: Nov. 22, 2007

(65) Prior Publication Data
US 2010/0113630 A1 May 6, 2010

(30) Foreign Application Priority Data

May 15, 2006  (IL) .......................................... 175638
Jun. 8, 2006  (IL) .......................................... 176220

(51) Int. Cl.
| C08G 18/22 | (2006.01) |
| C08J 9/00 | (2006.01) |
| C08G 18/00 | (2006.01) |
| C08K 5/05 | (2006.01) |
| D06P 1/92 | (2006.01) |
| C08G 18/48 | (2006.01) |
| C08G 18/40 | (2006.01) |
| C09K 21/12 | (2006.01) |
| C08G 18/58 | (2006.01) |
| C08G 18/66 | (2006.01) |
| C09K 21/08 | (2006.01) |
| C08K 5/06 | (2006.01) |
| C08G 101/00 | (2006.01) |

(52) U.S. Cl.
CPC ............ *C09K 21/12* (2013.01); *C08G 18/4829* (2013.01); *C08G 18/4045* (2013.01); *C08G 18/582* (2013.01); *C08G 18/6611* (2013.01); *C08G 2105/02* (2013.01); *C08G 2101/0025* (2013.01); *C08G 18/4816* (2013.01); *C09K 21/08* (2013.01); *C08K 5/06* (2013.01)
USPC ............................ 521/119; 159/170; 524/380

(58) Field of Classification Search
USPC .......... 521/170, 172, 174, 119, 159; 524/380
See application file for complete search history.

(56) References Cited

U.S. PATENT DOCUMENTS

| 3,478,126 | A | | 11/1969 | Turpin | |
| 3,932,541 | A | | 1/1976 | Davis et al. | |
| 4,052,346 | A | * | 10/1977 | Rudner et al. | 521/112 |
| 4,067,911 | A | | 1/1978 | Walraevens et al. | |
| 4,194,068 | A | | 3/1980 | Miller et al. | |
| 4,511,688 | A | | 4/1985 | Termine et al. | |
| 4,562,216 | A | * | 12/1985 | Kishida et al. | 523/433 |
| 4,717,509 | A | | 1/1988 | Buttgens et al. | |
| 4,748,195 | A | | 5/1988 | Hackl et al. | |
| 5,401,824 | A | * | 3/1995 | Clatty et al. | 528/53 |
| 5,837,799 | A | * | 11/1998 | Chen et al. | 528/102 |
| 6,127,558 | A | | 10/2000 | Bar-Yaakov et al. | |
| 6,340,721 | B1 | * | 1/2002 | Hashitani et al. | 524/109 |
| 8,067,497 | B2 | | 11/2011 | Bar-Yaakov et al. | |
| 2004/0229982 | A1 | * | 11/2004 | Goossens et al. | 524/114 |
| 2005/0209357 | A1 | | 9/2005 | Xu et al. | |
| 2006/0148948 | A1 | * | 7/2006 | Bar-Yaakov et al. | 524/380 |

FOREIGN PATENT DOCUMENTS

| CA | 2182714 | 2/1997 |
| DE | 4309981 | 10/1994 |
| DE | 198 47 627 | 4/2000 |
| JP | 64-074262 | 3/1989 |
| JP | 64-074263 | 3/1989 |
| JP | 3-097708 A1 | 4/1991 |
| WO | 99/31173 | 6/1999 |
| WO | 03/060000 | 7/2003 |
| WO | 2005054330 A1 | 6/2005 |
| WO | 2005/121248 | 12/2005 |
| WO | 2005118720 A1 | 12/2005 |

* cited by examiner

Primary Examiner — Melissa Rioja
(74) Attorney, Agent, or Firm — Dilworth & Barrese, LLP

(57) ABSTRACT

A liquid flame retardant composition having one or more flame retarding agents, which are the epoxides obtainable by reacting tetrabromobisphenol A with epichlorohydrin and their end-capped derivatives represented by Formula (1), is provided. The liquid composition is especially useful in the preparation of rigid polyurethane foams.

19 Claims, No Drawings

FLAME RETARDANT COMPOSITION

BACKGROUND OF THE INVENTION

The process of homogeneously blending solid or wax-like non-readily soluble flame retardants in the liquid precursors of polyurethane foams typically needs to be carried out with heating. It would be beneficial to provide the flame retardant in the form of a preformed liquid composition, thereby obviating the need to perform the blending process with the polyurethane foam precursors under heating, and thus considerably simplifying the process of manufacturing the foam. This may be especially useful in view of the fact that the preparation of polyurethane foams is very often carried out outdoors, e.g., at construction sites.

Attempts to address the aforementioned problem are described in WO 03/060000 and U.S. Pat. No. 4,717,509, which refer to the use of tetrabromobisphenol A and tribromoneopentyl alcohol, respectively, as flame retardants for rigid polyurethane foams.

The present invention is concerned with the class of flame retardants obtainable by reacting tetrabromobisphenol A (chemically named 4,4'-isopropylidene-bis(2,6-dibromophenol) with epichlorohydrin (chemically named chloromethyl oxirane). The reaction of tetrabromobisphenol A with epichlorohydrin is known to yield various reactive epoxides having high bromine content, which may be used as such, or in the form of their end-capped derivatives, as flame retardants in polymeric compositions. The aforementioned epoxides and end-capped derivatives thereof are identified by formula (1):

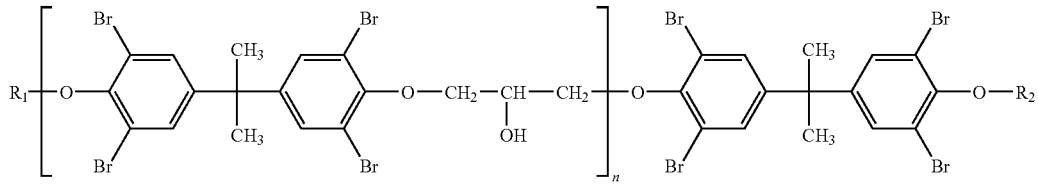

wherein n, the degree of polymerization, is an integer in the range between 0 and 5, and more preferably in the range between 0 and 4, and $R_1$ and $R_2$ are independently selected from the group consisting of the following monovalent radicals:

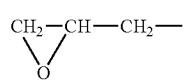

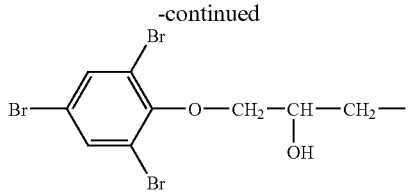

The compounds of formula (1) were proposed in JP 64-074262 and JP 64-074263 for use in connection with thermoplastic polyurethanes.

SUMMARY OF THE INVENTION

It has now been found that the burning characteristics of rigid polyurethane foams can be favorably modified by incorporating the aforementioned solid or highly viscous epoxides and end-capped derivatives thereof into the reaction mixture prior to the foaming stage. It has also been found that is possible to dissolve considerable quantities of one or more of these solid or highly viscous flame retardants and structural analogues thereof in a liquid which is either a polyol or an ester of phosphoric acid, or a mixture of said two liquids, to give a stable liquid composition from which the precipitation of said flame retardant is substantially prevented during long storage periods at ambient temperature. The resulting stable liquid composition may be conveniently used for delivering the flame retarding agent to the foaming system, to allow their incorporation into the rigid polyurethane foam.

Accordingly, the present invention provides a liquid flame retardant composition which comprises:
A) One or more flame retarding agents represented by the following structural formula (1):

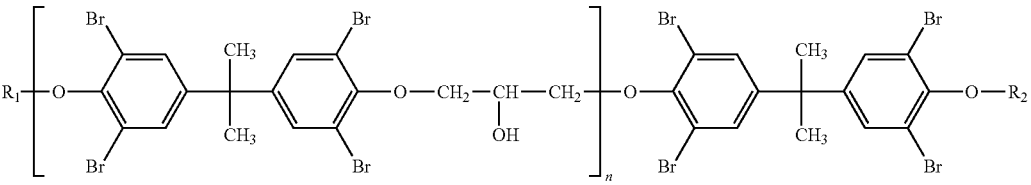

wherein n, the degree of polymerization, is an integer in the range between 0 and 5, and more preferably in the range between 0 and 4, and $R_1$ and $R_2$ are independently selected from the group consisting of the following monovalent radicals:

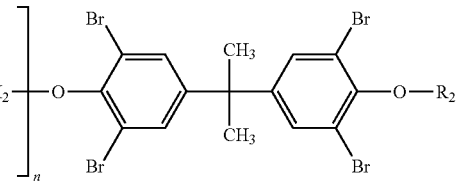

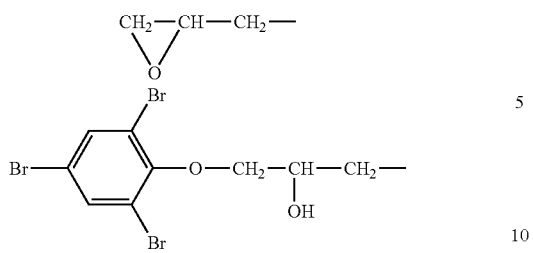

and
B) one or more liquids selected from the group consisting of polyols and esters of phosphoric acid.

Preferably, the liquid composition comprises flame retarding agent represented by the following formula (1'):

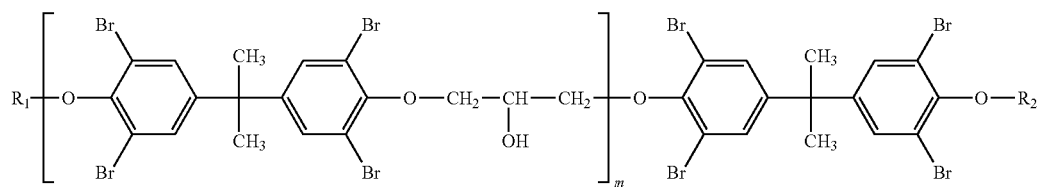

wherein m is the weight average degree of polymerization and is in the range between 0.05 and 1.0, and more preferably, in the range between 0.05 and 0.7, and $R_1$ and $R_2$ are as defined above. An especially preferred flame retarding agent falling within the scope of formula (1) above is a mixture comprising symmetric epoxy resins represented by the following Formula (1a):

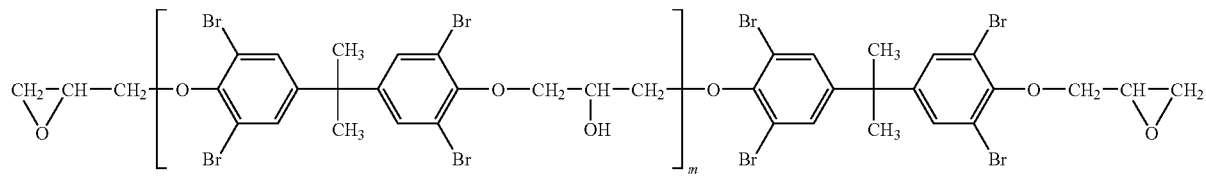

wherein m, the weight-average degree of polymerization, is in the range between 0.05 and 0.5. More specifically, the epoxy-terminated flame retarding agent represented by Formula (1a) has an average epoxy equivalent weight of not less than 350 g/eq (wherein m equals 0.063), and more preferably of not less than 370 g/eq (wherein m equals 0.113), and even more preferably in the range between 380 and 420 g/eq. The epoxy equivalent weight (EEW) is defined as the molecular weight of the substance divided by the number of epoxy groups contained therein, and may be measured by methods known in the art (e.g., "Encyclopedia of polymer science and engineering" John Wiley & Sons, Vol. 6 (1986)).

The flame retarding agent identified by Formula (1a) is accordingly provided in the form of a mixture comprising the following epoxides:

(1a-I) the monomer of tetrabromobisphenol A diglycidyl ether, wherein in Formula (1) n equals 0 and $R_1$ and $R_2$ are both glycidyl groups, as shown by the following Formula (1a-I):

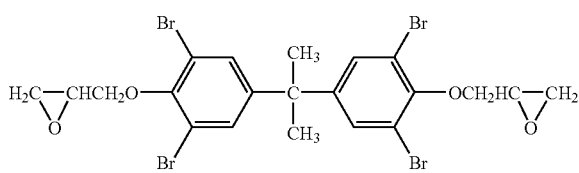

The epoxy equivalent weight of the monomer is 328 g/eq.

(1a-II) the dimer of tetrabromobisphenol A diglycidyl ether, wherein in Formula (1) n equals 1 and $R_1$ and $R_2$ are both glycidyl groups, as shown by the following Formula (1a-II):

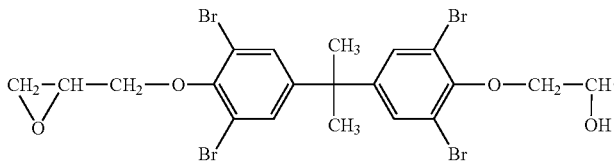 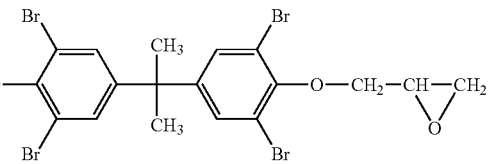

The epoxy equivalent weight of the dimer is 628 g/eq.

(1a-III) the trimer of tetrabromobisphenol A diglycidyl ether, wherein in Formula (1) n equals 2 and $R_1$ and $R_2$ are both glycidyl groups. The epoxy equivalent weight of the trimer is 928 g/eq.

Most preferably, the preferred flame retarding agent identified by Formula (1a) is a mixture having average epoxy equivalent weight in the range between 385 and 415 g/eq, which mixture is composed mostly of the monomer of Formula (1a-I) and the dimer of Formula (1a-II), with the trimer (1a-III) and possibly higher order oligomers of the diglycidyl ether of tetrabromobisphenol A being present in a total amount not greater than 15%. The preferred profile of the molecular weights distribution of the various epoxy resins composing the flame retarding agent of Formula (1a), as may be determined by gel permeation chromatography (GPC), is as follows (the ranges are given in terms of weight percent relative to the total weight of the flame retarding agent of Formula (1a)):

The monomer identified as (1a-I): 55-70%
The dimer identified as (1a-II): 20-35%
The trimer identified as (1a-III): 5-10%
High order oligomers: less than 5%

The flame retarding agent represented by Formula (1a) can be prepared by methods known in the art and is also commercially available. For example, the flame retarding agent of Formula (1a) having an average epoxy equivalent weight of about 400 g/eq is commercially available under the trade name F-2001 (Dead Sea Bromine Group). Hereinafter, "F-2001" is used to designate the mixture identified above. The flame-retardant of Formula (1a) is typically produced by reacting tetrabromobisphenol A with epichlorohydrin, optionally in an inert solvent such as toluene or methyl isobutyl ketone, in the presence of a base (e.g., an aqueous solution of sodium hydroxide) under heating. Following phase separation, the organic phase, which contains the product, is washed with water to remove residual salts therefrom and the product is finally recovered by distilling the organic solvent. The average epoxy equivalent weight of the product, namely, the distribution of the various epoxy resins of Formulas (1a-I), (1a-II) and (1a-III) within the product mixture, may be controlled by modifying the ratio of the reactants. The lower the concentration of epichlorohydrin used, the higher the epoxy equivalent weight of the resulting mixture.

Another preferred sub-class of flame retarding agents falling within the scope of Formula (1) includes the tribromophenol-terminated derivatives, wherein both end units $R_1$ and $R_2$ have the following meaning:

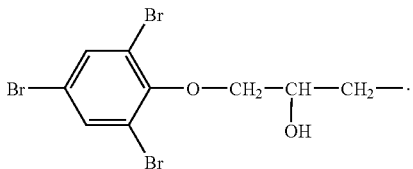

Thus, a preferred flame retarding agent to be used according to the present invention comprises one or more tribromophenol-terminated compounds represented by Formula (1b):

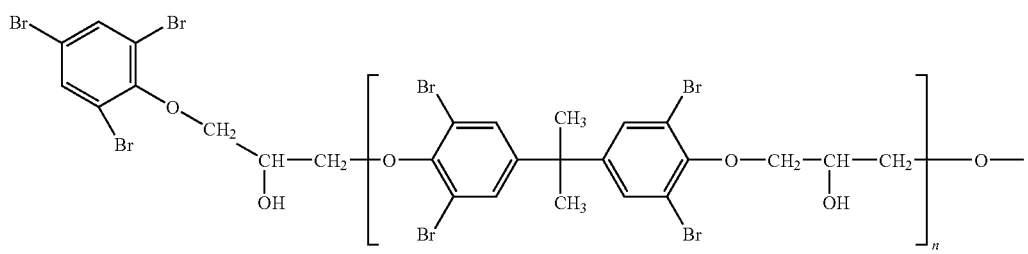

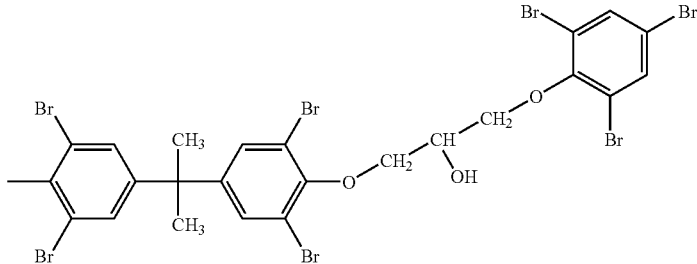

wherein n is an integer in the range between 0 and 5, and more preferably in the range between 0 and 4. More specifically, the flame retarding agent to be used according to the present invention is bis(2,4,6-tribromophenyl ether)-terminated tetrabromobisphenol A-epichlorohydrin resin, which is provided in the form of various mixtures comprising the individual derivatives represented by Formula (1b):

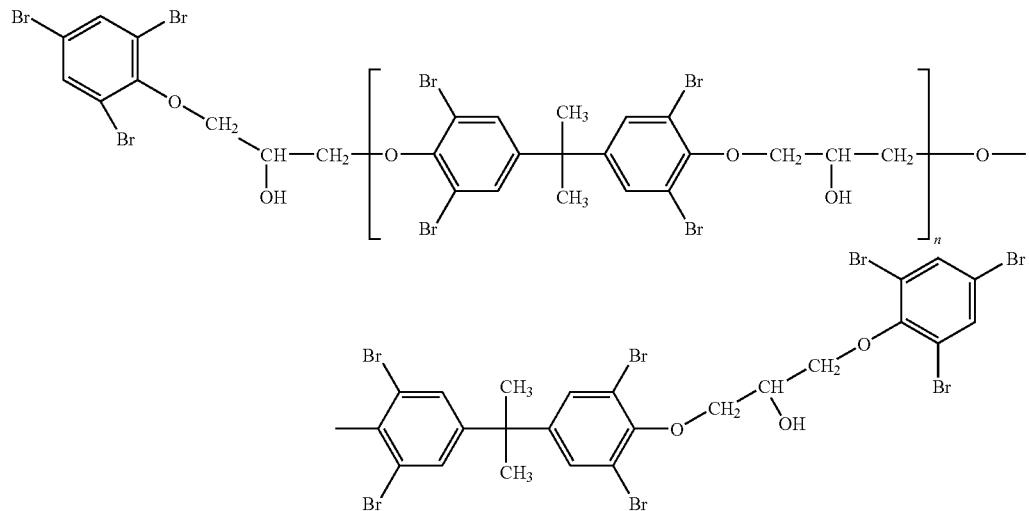

wherein n equals 0, 1 and 2. Hereinafter, these individual compounds are respectively identified as the monomer of Formula (1b), abbreviated (1b-I); the dimer of Formula (1b), abbreviated (1b-II); and the trimer of Formula (1b), abbreviated as (1b-III).

According to one embodiment of the invention, the aforementioned resin is provided in the form of a mixture which is essentially composed as follows (the composition of the mixture may be determined by GPC; the ranges are given in terms of weight percent of the individual compound relative to the total weight of the mixture):

The monomer (1b-I): 55-70%, and preferably about 65-70%;
the dimer (1b-II): 20-35%, and preferably about 25-30%;
the trimer and higher order oligomers (1b-III): 5-15%, and preferably about 5-10%.

According to an alternative embodiment, the aforementioned resin is provided in the form of a mixture comprising:
The monomer (1b-I): 30-50%, and preferably about 35-45%;
the dimer (1b-II): 5-15%, and preferably about 7-13%;
the trimer (1b-III): 5-20%, and preferably about 10-15%.

Higher order oligomers: 20-40%, and preferably 25-35%; and less than 10% a compound of Formula (1) wherein the end units $R_1$ and $R_2$ are different.

The aforementioned sub-class of flame retarding agents, which comprises one or more tribromophenol-terminated compounds represented by Formula (1b):

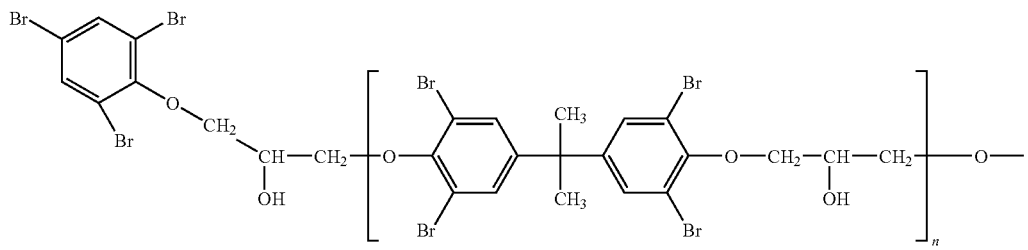

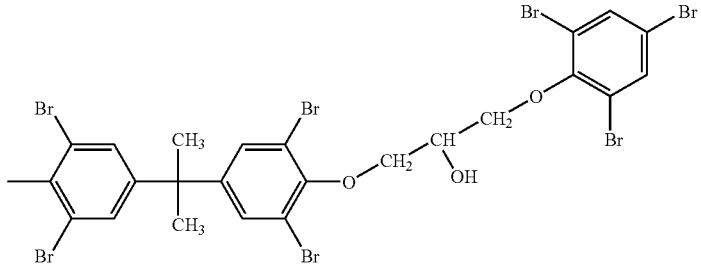

wherein n is an integer in the range between 0 and 5, and more preferably in the range between 0 and 4, can be prepared by methods known in the art and is also commercially available (e.g., F-3014 and F-3020 manufactured by Dead Sea Bromine Group, which correspond to the first and second mixtures with the compositions identified above, respectively). The tribromophenol-terminated resins of Formula (1b) may also be obtained by reacting the mixture of epoxy resins identified by Formula (1a) with tribromophenol, possibly in a solvent. The reaction is carried out under heating in the presence of a catalyst (e.g., Li based catalyst) or an inorganic base, such as sodium hydroxide or potassium hydroxide, or an organic base, such as tertiary amine, quaternary ammonium salt or a quaternary phosphonium salt. A preparative procedure is illustrated below.

It should be noted that the flame retarding agents to be used according to the present invention may comprise both symmetrical and unsymmetrical derivatives (wherein $R_1$ and $R_2$ in Formula (1) are the same or different, respectively).

As explained above, the invention provides a liquid composition that contains the flame retarding agent identified by Formula (1) above, and more specifically, by Formulas (1a) and (1b). The liquid composition is essentially homogeneous, such that the formation of a separate phase containing the flame retarding agent represented by said structural formulas from the liquid medium is substantially prevented. The term "substantially prevented" in this context is used to indicate that the liquid composition may exist either in the form of a clear, stable solution or as a composition in which a second phase (e.g. a precipitate) is formed, wherein said second phase contains the flame retarding agent in an amount which does not exceed 5% of the total weight of said agent in the composition.

Preferably, the weight concentration of the flame retarding agent of Formula (1) in the composition of the present invention is in the range between 10 and 60%, and more preferably in the range between 20 and 45%, such that the bromine content of the composition provided by the present invention is not less than 5%, and preferably not less than 15% (w/w). More preferably, the bromine content is not less than 25% (w/w).

The liquid component according to the composition of the invention, which allows for the dissolution of the flame retarding agent of Formula (1) therein, is either a polyol or an ester of phosphoric acid (phosphate esters), or a mixture thereof.

The term "polyol", as used herein, refers to a compound containing two or more hydroxyl groups, and preferably to hydroxyl-containing polymers which are hydroxyl-containing polyethers or polyesters. As a polyol, it is preferred to use a polyol the number of hydroxyl groups thereof is not less than 3, or a mixture of such polyols. According to one embodiment, the polyols to be used according to the present invention are polyether polyols. This class of polyols is obtained by the ring opening addition reaction of one or more alkylene oxides (e.g., ethylene oxide and propylene oxide) with a suitable reactant containing active hydrogen atoms, such as alcohols, amines and acids; more specifically, said reactant may be selected from the group consisting of diols, triols, novolac resins, pentaerythritol, sorbitol, sucrose, ethylenediamine, diethylenetriamine and the like. Polyesterpolyols may also be used according to the present invention; this class of polyols is obtained by the condensation reaction of dicarboxylic (or polycarboxylic) acid, such as adipic acid, phthalic acid or the like, with diols and triols (e.g., ethylene glycol, propylene glycol, diethylene glycol and the like). A particularly preferred polyol to be used according to the present invention is a glycerol-based polyether polyol. The hydroxyl number of the polyol is preferably in the range of 150 to 850 mg KOH/g, and more preferably in the range of from 200 to 600 mg KOH/g. The term "hydroxyl number" indicates the number of reactive hydroxyl groups available for reaction, and is expressed as the number of milligrams of potassium hydroxide equivalent to the hydroxyl content of one gram of the sample.

The polyol to be used according to the present invention may be either a non-halogenated polyol, or halogenated polyol, or a mixture thereof. For example, halogenated polyols are described in U.S. Pat. No. 4,067,911, which is incorporated herein by reference. More preferred, however, are the non-halogenated polyols.

The weight concentration of the polyol(s) relative to the total weight of the composition is preferably between 10 and 70%, and more preferably between 20 and 60%, and most preferably between 40 and 60%.

As an ester of a pentavalent acid of phosphorus, namely, an ester of phosphoric acid, it is preferred to use halogenated, and more specifically, chlorinated alkyl phosphate ester. Particularly preferred are the triesters—trialkyl phosphates—such as tri(monochloroalkyl) phosphate or tri(dichloroalkyl) phosphate, with tris(2-chloropropyl)phosphate being especially preferred. The term "alkyl" preferably refers to $C_1$-$C_5$ alkyl. It should be noted that the phosphate ester may be either symmetric or un-symmetric, containing identical or different alkyl groups, respectively.

The weight concentration of the ester of phosphoric acid relative to the total weight of the composition is preferably between 10 and 70%, and more preferably between 20 and 60%, and most preferably between 40 and 60%.

The composition according to the present invention is prepared by heating, preferably under stirring, suitable quantities of the flame retarding agent of Formula (1) together with the liquid component, which is either a polyol or an ester of a pentavalent acid of phosphorus, or a mixture thereof, until a clear solution is obtained, following which the liquid composition is cooled and stored until use.

More preferably, the composition according to the present invention is prepared by introducing into a suitable vessel the liquid component, heating the same to a first temperature in the range between 50 and 60° C., adding the flame retarding agent of Formula (1) into said vessel, preferably under stirring, and heating the resulting mixture to a second temperature in the range between 65 and 100° C. A clear solution is generally obtained following a heating period of about 60 to 120 minutes at said second temperature. The mixture is then cooled to give the liquid flame retardant composition of the present invention in the form of a clear, stable solution.

The liquid composition is capable of retaining the form of a stable solution at ambient temperature for not less than 50 days, and more preferably for not less than 70 days, and even more preferably not less than 90 days. For the purpose of this specification, ambient temperature is from 20 to 25° C. According to another embodiment, the liquid composition is capable of retaining the form of a stable solution at −18° C. for at least three days. The aforementioned stability tests may be performed by producing the liquid flame retardant according to the relevant composition, storing the same under the relevant conditions and following the waiting period(s) specified above, observing the composition to determine the presence or absence of a precipitate therein.

It has also been found that tribromoneopentyl alcohol, a flame retarding agent represented by the structure of Formula 2:

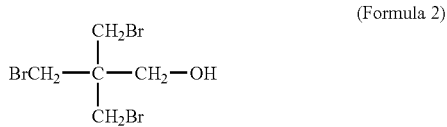

(Formula 2)

which is solid at room temperature, can also be successfully dissolved in the liquid composition provided by the present invention, without altering the stability of the composition, such that the resulting composition retains the form of a solution at ambient temperature over a long storage period. Furthermore, it has been found that the combination of the flame retarding agent of Formula (1) together with tribromoneopentyl alcohol in the liquid composition of the present invention is especially useful regarding the contemplated application for polyurethane foams, as will be discussed and exemplified in more detail below. Preferably, the weight concentration of tribromoneopentyl alcohol is in the range between 10 and 50%, and more preferably in the range between 20 and 40%, relative to the total weight of the composition. When compositions comprising tribromoneopentyl alcohol are prepared, the preparative procedure described above is followed, with tribromoneopentyl alcohol being introduced into the liquid either prior to or following the addition of the flame retarding agent of Formula (1). Tribromoneopentyl alcohol is commercially available from Dead Sea Bromine Group under the trade name FR-513. Methods for preparing tribromoneopentyl alcohol are described in U.S. Pat. No. 3,932,541.

An especially preferred liquid flame retardant composition according to the present invention is a solution comprising 20-40 wt % of the flame retarding agent of Formula (1), and more preferably, of Formulas (1a) or (1b) as defined above, and 20-40 wt % of tribromoneopentyl alcohol, dissolved in one or more solvents selected from the group consisting of non-halogenated polyether-polyols, and more specifically, glycerol based polyether-polyols (e.g., Alcupol C-5710) and halogen-containing esters of phosphoric acid, and more specifically, tris(2-chloropropyl)phosphate. The weight percents given above are relative to the total weight of the composition.

It should be noted that the liquid composition may contain additional ingredients that are generally useful for the contemplated application of the flame retardant composition, namely, for the preparation of rigid polyurethane foams. For example, the composition may include an antioxidant, preferably at a concentration of up to 2000 ppm, which is used for stabilizing the polyol solvent present in the composition. Most preferred is a phenolic antioxidant, which may be selected from the group consisting of 2,6-di-tert-butyl-p-cresol, 4,4'-methylenebis(2,6-di-tert-butylphenol), 2,2'-methylenebis(4,6-di-tert-butylphenol) and octadecyl 3,5-di-tert-butyl-4-hydroxyhydrocinnamate, and mixtures thereof.

The novel composition of the present invention is particularly useful as a flame retardant for polyurethane and polyisocyanurate foams. As explained hereinabove, the liquid composition provided by the present invention is a solution that contains the flame retarding agent of Formula (1), and more preferably of Formulas (1a) and (1b), optionally in combination with tribromoneopentyl alcohol, as a solute, and may therefore be directly added to the liquid mixture of reactants used for preparing polyurethane and polyisocyanurate foams, whereby the blending operation of said mixture is considerably simplified and a uniform distribution of the components to be reacted is readily obtained in said mixture.

Thus, the new flame retardant compositions of the present invention may be added to standard formulations suitable for obtaining rigid polyurethane foams (by continuous, discontinuous or spray methods) or polyisocyanurate foams. Accordingly, in another aspect, the present invention provides a process, which comprises:

providing a preformed liquid composition containing a flame retarding agent of Formula (1), and more preferably of Formula (1a) or Formula (1b), wherein said agent is dissolved in a liquid comprising one or more polyols and/or one or more esters of phosphoric acid, wherein tribromoneopentyl alcohol is preferably present in said liquid composition; and mixing said liquid composition with additional quantities of one or more polyols, thereby affording a polyol component suitable for the preparation polyurethane or polyisocyanate foams.

By the term "polyol component" is meant the total quantity of polyols that needs to be reacted to afford the foam. Generally, the flame-retardant liquid composition of the present invention constitutes about 10 to 40% by weight of the polyol component. The resulting polyol component is subsequently reacted with an isocyanate component in the presence of a blowing agent and a catalyst, to obtain the polyurethane or polyisocyanate foam.

The liquid composition containing the flame retarding agent of Formula (1), preferably together with tribromoneopentyl alcohol, is used in a sufficient amount in order to allow the final foam to satisfy the requirements of the DIN 4102 B2 test. The bromine content of the final foam is typically not less than 1%. Preferably, the amount of the liquid composition of the invention is adjusted such that the bromine content of the final foam is in the range of 1 to 15%, and more preferably in the range of 2 to 10%, and most preferably in the range of 2 to 5%, relative to the total weight of the foam.

If desired, the process according to the present invention for preparing the polyol component may be conveniently carried out on-site. The preformed liquid composition containing the flame retarding agent of Formula (1), preferably together with tribromoneopentyl alcohol, is mixed on-site with one or more polyols (such as the polyether-polyols and polyester-polyols listed above), to give the polyol component of the foam, followed by the addition of a blowing agent and a catalyst, and possibly a surfactant, to said polyol component. The fact that the mixing step may be carried out on-site at the environmental temperature at the working site, to afford a polyol component containing the flame retardant homogeneously distributed therein, constitutes an important advantage of the present invention.

Suitable blowing agents to be used according to the present invention are well known in the art and include, for example, water (which produces carbon dioxide upon reaction with isocyanate) and low-boiling organic liquids, such as pentane or halogenated hydrocarbons (e.g., methylene chloride). The amount of the blowing agent may vary within a broad range.

As a reaction catalyst, intended for accelerating the reaction between the polyol component and the diisocyanate component, it is common to use aromatic and/or aliphatic amines, or organic metal salts, or mixtures thereof. Amine catalysts may be selected from the group consisting of triethylenediamine, dimethylethanolamine (DMEA), tetramethylbutanediamine (TMBDA), dimethylcyclohexylamine (DMCHA), and triethylamine (TEA). Organometallic salts are preferably based on the following metals: tin, zinc, manganese, magnesium, bismuth, antimony, lead and calcium. Particularly preferred are stannous compounds such as stannous octoate and stannous dibutyltindilaurate. Preferably, the weight concentration of the catalyst, relative to the polyol component, is in the range between 1 and 5% (wt %).

It is also common to use a surfactant in a small amount, up to 2% of the weight of the polyol component in the preparation of the polyurethane foam. To this end silicones may be used.

Having formed the polyol component, which contains the aforementioned catalyst, blowing agent and surfactant dissolved therein, said polyol component is reacted with the isocyanate component to give the desired foam. Suitable isocyanates to be used according to the present invention may be selected from the group consisting of aliphatic, cycloaliphatic, araliphatic, aromatic or heterocyclic polyisocyanates, such as 4,4'-diphenylmethane diisocyanate, toluylene diisocyanate, isopropyl diisocyanate and hexamethylene diisocyanate. The amount of the diisocyanate that is required for producing the foam is calculated according to the hydroxyl number of the polyol component and any other reactive hydrogen-containing compounds present. It is also possible to use the diisocyanate in a slight excess.

The rigid polyurethane foams may be prepared by either continuous, discontinuous or spray methods, which are well known in the art.

In a discontinuous process, all the components are mixed and poured into a mould, normally made of wood or metal, to form the foam. Following a suitable period of time, which depends on the system and size of the mould, the foam is removed from the mould as a block. The block is cured and then is cut into panels, half shells or other shapes.

In a continuous process, the reaction mixture is dispersed from a traversing head onto a conveyor, which is covered with a paper in order to facilitate release of the foam. During the expansion of the foam, the sides are supported by vertical conveyors. At the end of the foaming line, the foam is cut into buns and stored for a specified time. Later, the foam can be cut into the required shape.

Spray techniques are used for filling molds and panels and for applying foam to plane surfaces. Spraying is particularly useful in applications where large areas are involved, such as tanks or building walls. Sprayed rigid foam coatings provide both physical strength and improved insulation.

As indicated above, hitherto the compounds of formula 1 were not proposed for lowering the combustibility of rigid polyurethane foams. Thus, the present invention also relates to a process for preparing flame-retarded rigid polyurethane foams, which comprises reacting a polyol component and diisocyanate component in the presence of one or more flame retardant agents represented by Formula (1) above, and more preferably by Formula (1a) or (1b), at least one blowing agent, at least one catalyst, at least one surfactant and at least one phosphate ester as described above, to form a rigid polyurethane foam. The resulting rigid polyurethane foam is characterized by a structural unit corresponding to the flame retardant of Formulas (1a) or (1b), preferably at a concentration of 1 to 5% relative to the total weight of the foam; this rigid polyurethane foam forms another aspect of the present invention.

DESCRIPTION OF THE PREFERRED EMBODIMENTS

The following preparative examples illustrate preferred embodiments of the invention.

Examples

Preparation 1

Preparing a Flame Retarding Agent of Formula 1(b)

To a 1-liter glass kettle equipped with stirrer, electric heating mantle, a thermometer and a reflux condenser were added 100 grams of brominated epoxy resin (commercially available as F-2001) having the following characteristics: EEW of 398 grams per mole and bromine content of 49% (w/w), 300 grams methyl isobutyl ketone and 155 grams of tribromophenol. The mixture was stirred until all solids dissolve and then 0.75 grams of tributyl amine was added. The reaction mixture was heated slowly to reflux and the reaction continued for 6 hours.

After cooling to room temperature, the reaction mixture was washed 3 times with distilled water followed by phase separation of the aqueous phase. Finally the methyl isobutyl ketone was distilled off at 160° under vacuum.

250 grams of the resin according to Formula (1b) were obtained having the following properties:
Softening point: 101° C.
Average molecular weight (as determined by GPC): 1460
Bromine content: 59 wt %.

The procedure described above may be modified in order to obtain different resins of Formula (1b), namely, mixtures comprising the monomer (1b-I), the dimer of Formula (1b-II), the trimer of Formula (1b-III) and higher oligomers in different proportions, by changing the weight ratio of the reactants (e.g., reacting 574 g of YDB 400 or F-2001, 294.6 g of tribromophenol and 127 g of tetrabromobisphenol A).

Examples 1-6

Liquid Flame-Retardant Compositions which Contain the Epoxy Resins of Formula (1a)

Table 1 summarizes the compositions of several liquid flame-retardant formulations of the present invention and stability tests carried in respect thereto, which compositions are based on a flame retarding agent of Formula (1a), or a combination thereof with tribromoneopentyl alcohol. The general preparative procedure was as follows:

A 0.5 liter reactor, equipped with a mechanical stirrer, a thermometer and a reflux condenser, was charged with the liquid component (a non-halogenated polyether polyol, which is Alcupol C-5710; or halogen-substituted organic phosphate, which is tris(2-chloropropyl)phosphate (TCPP), or a mixture thereof) and was heated to 60° C. The flame retarding agent (F-2001 or F-2001 and subsequently FR-513, or vice versa) was then added to the reactor, after which the temperature was increased to 70-100° C. The resulting mixture was heated for about two hours at 70-100° C., until a clear solution was obtained. After cooling to room temperature, a stable solution was obtained.

TABLE 1

Compositions based on F-2001

| Ex. | F-2001, wt % | FR-513, wt % | TCPP, wt % | C5710 (polyol), wt % | OH number | Br, wt % | Stability, Days* |
|---|---|---|---|---|---|---|---|
| 1 | 60 | — | 40 | — | ~0 | ~30 | ~180 |
| 2 | 20 | 30 | 50 | — | 52 | ~32 | ~180 |
| 3 | 30 | 30 | 40 | — | 52 | ~36 | ~180 |
| 4 | 20 | 30 | — | 50 | 337 | ~32 | ~180 |
| 5 | 60 | — | 20 | 20 | 114 | ~30 | ~180 |
| 6 | 20 | 30 | 30 | 20 | 166 | ~32 | ~180 |

The values given for the stability represent the length of time during which the compositions have been stored under ambient temperature conditions without the formation of a precipitate. The tests are continuing and thus the values given are not the limits of the stability.

The liquid compositions of the present invention were used as flame retardants in standard formulations for rigid polyurethane foams. The foams were prepared either by continuous or discontinuous processes (Examples 7-11 and Examples 12-16 below, respectively).

In addition to the flame retardant liquid compositions of the present invention, the following materials were used in the preparation of the polyurethane foams:
Polyols Used for Continuous Production:
1. Terol 516—Polyester polyol having a hydroxyl value of 305 mg KOH/g.
2. Fox-O-Pol M530—polyol having a hydroxyl value of 530 mg KOH/g.
3. Glycerol.

Polyols Used for Discontinuous Production:
1. Alcupol R-2510—Glycerol initiated polyether polyol having a hydroxyl value of 250 mg KOH/g.
2. Alcupol C-5710—Glycerol initiated polyether polyol having a hydroxyl value of 570 mg KOH/g.
3. Alcupol R-4720—Sorbitol initiated polyether polyol having a hydroxyl value of 475 mg KOH/g.

Ancillary Chemicals

| | |
|---|---|
| DMCHA | dimethylcyclohexylamine |
| AM 58 | trimerisation catalyst |
| DC 193 | silicone surfactant |
| TCPP | tris(chloropropyl)phosphate |
| TEP | triethylenephosphate |
| Pentane | blowing agent |

Isocyanate
MDI: polymeric diphenylmethane diisocyanate

Examples 7-11

Continuous System for Preparing Rigid Polyurethane Foams Using F-2001 Based Liquid Flame Retardant Compositions The procedure for the foam preparation was as follows:

The polyols, water, surfactant, the F-2001 based flame retardant compositions of Examples 2 to 6 (abbreviated "FR of Example x" in table 2 below) phosphate esters and catalysts were weighed and placed in a mixing beaker and mixed to form a homogeneous solution. To this solution was added pentane, and after additional mixing, the polymeric isocyanate. The mixture was stirred at 3000 rpm for 6 sec and poured into another beaker. The foam that formed was kept at least 24 hr at room temperature and then removed from the beaker and cut into test specimens with a saw. The samples were then tested for flammability according to the DIN 4102 B2 test procedure (a flame height of 15.0 cm or less means that the foam has passed the test). Table 2 summarizes the ingredients and parameters for the foam preparation and the results of the testing of the foams.

TABLE 2

Pentane-blown B2 continuous system using compositions based on F-2001 (mixed at 20° C.)

| Composition (g) | Example 7 | Example 8 | Example 9 | Example 10 | Example 11 |
|---|---|---|---|---|---|
| M530 | 30 | 30 | 30 | 30 | 30 |
| Terol 516 | 30 | 30 | 30 | 30 | 30 |
| Glycerol | 7 | 7 | 5 | 5 | 5 |
| FR of Example 2 F-2001/FR-513/TCPP 20:30:50 | 37.2 | | | | |
| FR of Example 3 F-2001/FR-513/TCPP 30:30:40 | | 37.2 | | | |
| FR of Example 4 F-2001/FR-513/C5710 20:30:50 | | | 37.2 | | |
| FR of Example 5 F-2001/TCPP/C5710 60:20:20 | | | | 37.2 | |
| FR of Example 6 F-2001/FR-513/TCPP/C5710, 20:30:30:20 | | | | | 37.2 |

TABLE 2-continued

Pentane-blown B2 continuous system using compositions based on F-2001 (mixed at 20° C.)

| Composition (g) | Example 7 | Example 8 | Example 9 | Example 10 | Example 11 |
|---|---|---|---|---|---|
| TCPP | 20 | 20 | 20 | 20 | 20 |
| TEP | 2.8 | 2.8 | 2.8 | 2.8 | 2.8 |
| DMCHA | 2 | 2 | 2 | 2 | 2 |
| AM58 | 1 | 1 | 1 | 1 | 1 |
| DC193 | 1.5 | 1.5 | 1.5 | 1.5 | 1.5 |
| Water | 2.49 | 2.49 | 2.49 | 2.49 | 2.49 |
| Pentane | 13.2 | 13.2 | 13.2 | 13.2 | 13.2 |
| Total | 147.19 | 147.19 | 145.19 | 145.19 | 145.19 |
| Isocyanate, g (Urestyl-10) | 154.57 | 154.57 | 173.72 | 150.84 | 156.17 |
| Mix time, sec | 6 | 6 | 6 | 6 | 6 |
| Cream time, sec | 12 | 12 | 13 | 12 | 12 |
| Gel time, sec | 33 | 32 | 39 | 32 | 34 |
| Tack free time, sec | 38 | 39 | 45 | 36 | 40 |
| Cure time, sec | 118 | 125 | 115 | 94 | 121 |
| Br content in polyol mixture, wt % | 8.9 | 10.2 | 9.0 | 8.5 | 9.0 |
| Br content in foam wt % | 4.2 | 4.8 | 3.9 | 4.0 | 4.2 |
| Flame height, cm (DIN 4102) | 8.9 | 7.6 | 9.1 | 8.8 | 8.5 |

In table 2 (and also in the tables 3 and 5 below) the parameters related to the foam preparation are defined as follows:

Cream time: The time between the discharge of the foam ingredients from the mixing beaker and the beginning of the rise of the foam.

Gel time: The time between the discharge of the foam ingredients from the mixing beaker and the time that the foam will stick to an introduced probe, and strings out from it when withdrawn.

Tack-free time: The time between the discharge of the foam ingredients from the mixing beaker and the time that the outer skin of the foam mass loses its stickiness or adhesive quality.

Cure time: The time required for sufficient reaction completion to develop the desired polymer properties such as strength, dimensional stability, elongation, etc.

Examples 12-16

Discontinuous System for Preparing Rigid Polyurethane Foams Using F-2001 Based Liquid Flame Retardant Compositions The procedure for the foam preparation was as follows:

The polyols, water, surfactant, F-2001 based flame retardant compositions of Examples 2 to 6 (abbreviated "FR of Example x" in table 3 below) phosphate esters and catalysts were weighed and placed in a mixing beaker, and mixed to form a homogeneous solution. To this solution was added the polymeric isocyanate, then the mixture was stirred at 3000 rpm for 15 sec and poured into another beaker. The foam that formed was kept at least 24 hr at room temperature and then removed from the beaker and cut into test specimens with a saw. The samples were then tested for flammability according to the DIN 4102 B2 test procedure (a flame height of 15.0 cm or less means that the foam has passed the test). Table 3 summarizes the ingredients and parameters for the foam preparation and the results of the testing of the foams.

TABLE 3

Water-blown B2 discontinuous system using compositions based on F-2001 (mixed at 20° C.)

| Composition (g) | Example 12 | Example 13 | Example 14 | Example 15 | Example 16 |
|---|---|---|---|---|---|
| R4720 | 35 | 35 | 35 | 35 | 35 |
| R2510 | 20 | 20 | 23 | 23 | 23 |
| C5710 | 21 | 21 | 18 | 18 | 18 |
| FR of Example 2 F-2001/FR-513/TCPP 20:30:50 | 20 | | | | |
| FR of Example 3 F-2001/FR-513/TCPP 30:30:40 | | 20 | | | |
| FR of Example 4 F-2001/FR-513/C5710 20:30:50 | | | 20 | | |
| FR of Example 5 F-2001/TCPP/C5710 60:20:20 | | | | 20 | |

TABLE 3-continued

Water-blown B2 discontinuous system using compositions based on F-2001 (mixed at 20° C.)

| Composition (g) | Example 12 | Example 13 | Example 14 | Example 15 | Example 16 |
|---|---|---|---|---|---|
| FR of Example 6 F-2001/FR-513/TCPP/C5710, 20:30:30:20 | | | | | 20 |
| TCPP | 25 | 25 | 25 | 25 | 25 |
| DMCHA | 0.9 | 0.9 | 0.9 | 0.9 | 0.9 |
| DC 193 | 1.5 | 1.5 | 1.5 | 1.5 | 1.5 |
| Water | 4.6 | 4.6 | 4.6 | 4.6 | 4.6 |
| Total | 128 | 128 | 128 | 128 | 128 |
| Isocyanate, g | 167.00 | 167.00 | 179.50 | 167.73 | 170.48 |
| Mix time, sec | 15 | 15 | 15 | 15 | 15 |
| Cream time, sec | 25 | 25 | 25 | 25 | 25 |
| Gel time, sec | 102 | 107 | 121 | 120 | 107 |
| Tack free, time | 231 | 209 | 220 | 239 | 216 |
| Br content in polyol mixture, wt % | 5.0 | 5.8 | 5.0 | 4.7 | 5.0 |
| Br content in foam, wt % | 2.2 | 2.5 | 2.1 | 2.0 | 2.1 |
| Flame height, cm (DIN 4102) | 9.4 | 11.8 | 11.4 | 13.0 | 11.6 |

Examples 17-27

Liquid Flame-Retardant Compositions which Contain the Tribromophenol-Terminated Resins of Formula (1b)

Table 4 summarizes the compositions of several liquid flame-retardant compositions of the present invention and stability tests carried out in respect thereto, which compositions are based on a flame retarding agent of Formula (1b), or a combination thereof with tribromoneopentyl alcohol. The general preparative procedure was as follows:

A 0.5 liter reactor, equipped with a mechanical stirrer, a thermometer and a reflux condenser, was charged with the liquid component (a non-halogenated polyether polyol, which is Alcupol C-5710; or halogen-substituted organic phosphate, which is tris(2-chloropropyl)phosphate (TCPP); or a mixture thereof) and was heated to 50-60° C. The flame retarding agent (F-3014, or F-3014 and subsequently FR-513, or vice versa) was then added to the reactor, after which the temperature was increased to 65-100° C. The resulting mixture was heated for about two hours at 65-100° C., until a clear solution was obtained. After cooling to room temperature, a stable solution was obtained.

TABLE 4

Compositions based on F-3014

| Example | F-3014, wt % | FR-513, wt % | TCPP, wt % | C5710 (polyol) wt % | OH number | Br, wt % | Stability, Days* |
|---|---|---|---|---|---|---|---|
| 17 | 60 | — | 40 | — | 48 | 36 | ~180 |
| 18 | 20 | 30 | 50 | — | 68 | 34 | ~180 |
| 19 | 30 | 30 | 40 | | 76 | 37 | ~180 |
| 20 | 20 | 30 | — | 50 | 353 | 34 | ~180 |
| 21 | 20 | 25 | | 55 | 373 | 30 | ~180 |
| 22 | 20 | 20 | | 60 | 393 | 27 | ~180 |
| 23 | 20 | 30 | 10 | 40 | 296 | 34 | ~180 |
| 24 | 20 | 30 | 20 | 30 | 239 | 34 | ~180 |
| 25 | 20 | 40 | — | 40 | 313 | 41 | ~180 |
| 26 | 20 | 40 | 25 | 15 | 173 | 41 | ~180 |
| 27 | 15 | 30 | — | 55 | 379 | 31 | ~180 |

The values given for the stability represent the length of time during which the compositions have been stored under ambient temperature conditions without the formation of a precipitate. The tests are continuing and thus the values given are not the limits of the stability.

Examples 28-38

Continuous System for Preparing Rigid Polyurethane Foams Using F-3014 Based Liquid Flame Retardant Compositions The compositions of Examples 17-27 were used for the preparation of rigid polyurethane foams according to the following procedure:

The polyols, water, surfactant, the F-3014 based flame retardant compositions of Examples 17-27 (abbreviated "FR of Example x" in Table 5 below) phosphate esters and catalysts were weighed and placed in a mixing beaker and mixed to form a homogeneous solution. To this solution was added pentane, and after additional mixing, the polymeric isocyanate. The mixture was stirred at 3000 rpm for 6 sec and poured into another beaker. The foam that formed was kept at least 24 hr at room temperature and then removed from the beaker and cut into test specimens with a saw. The samples were then tested for flammability according to the DIN 4102 B2 test procedure (a flame height of 15.0 cm or less means that the foam has passed the test). Table 5 summarizes the ingredients and parameters for the foam preparation and the results of the testing of the foams.

TABLE 5

Pentane-blown B2 continuous system using compositions based on F-3014 (mixed at 20° C.)

| Composition, g | Example 28 | Example 29 | Example 30 | Example 31 | Example 32 |
|---|---|---|---|---|---|
| M530 | 30 | 30 | 30 | 30 | 30 |
| Terol 516 | 30 | 30 | 30 | 30 | 30 |
| Glycerol | 7 | 7 | 7 | 5 | 5 |
| FR of Example 17 F-3014/TCPP 60:40 | 37.2 | | | | |
| FR of Example 18 F-3014/FR-513/TCPP 20:30:50 | | 37.2 | | | |
| FR of Example 19 F-3014/FR-513/TCPP 30:30:40 | | | 37.2 | | |
| FR of Example 20 F-3014/FR-513/C5710 20:30:50 | | | | 37.2 | |
| FR of Example 21 F-3014/FR-513/C5710 20:25:55 | | | | | 37.2 |
| TCPP | 20 | 20 | 20 | 20 | 20 |
| TEP | 2.8 | 2.8 | 2.8 | 2.8 | 2.8 |
| DMCHA | 2 | 2 | 2 | 2 | 2 |
| AM58 | 1 | 1 | 1 | 1 | 1 |
| DC193 | 1.5 | 1.5 | 1.5 | 1.5 | 1.5 |
| Water | 2.49 | 2.49 | 2.49 | 2.49 | 2.49 |
| Pentane | 13.2 | 13.2 | 13.2 | 13.2 | 13.2 |
| Total | 147.19 | 147.19 | 147.19 | 145.19 | 145.19 |
| Isocyanate, g (Urestyl-10) | 154.36 | 156.21 | 157.03 | 174.54 | 176.59 |
| Mix time, sec | 6 | 6 | 6 | 6 | 6 |
| Cream time, sec | 11.5 | 11.5 | 11.5 | 12.5 | 12 |
| Gel time, sec | 32 | 32 | 32 | 37 | 38 |
| Tack free time, sec | 36 | 35 | 37 | 43 | 42 |
| Cure time, sec | 93 | 99 | 108 | 112 | 106 |
| Br content in polyol mixture, wt % | 10.0 | 9.5 | 11.2 | 9.6 | 8.6 |
| Br content in foam, wt % | 4.7 | 4.4 | 5.2 | 4.2 | 3.7 |
| Flame height, cm (DIN 4102) | 9.3 | 11.3 | 9.3 | 11.4 | 11.8 |

| Composition, g | Example 33 | Example 34 | Example 35 | Example 36 | Example 37 | Example 38 |
|---|---|---|---|---|---|---|
| M530 | 30 | 30 | 30 | 30 | 30 | 30 |
| Terol 516 | 30 | 30 | 30 | 30 | 30 | 30 |
| Glycerol | 5 | 5 | 5 | 5 | 7 | 5 |
| FR of Example 22 F-3014/FR-513/C5710 20:20:60 | 37.2 | | | | | |
| FR of Example 23 F-3014/FR-513/TCPP/C5710; 20:30:10:40 | | 37.2 | | | | |
| FR of Example 24 F-3014/FR-513/TCPP/C5710; 20:30:20:30 | | | 37.2 | | | |
| FR of Example 25 F-3014/FR-513/TCPP 20:40:40 | | | | 37.2 | | |
| FR of Example 26 F-3014/FR-513/TCPP/C5710; 20:40:25:15 | | | | | 37.2 | |
| FR of Example 27 F-3014/FR-513/C5710 15:30:55 | | | | | | 37.2 |
| TCPP | 20 | 20 | 20 | 20 | 20 | 20 |
| TEP | 2.8 | 2.8 | 2.8 | 2.8 | 2.8 | 2.8 |
| DMCHA | 2 | 2 | 2 | 2 | 2 | 2 |
| AM58 | 1 | 1 | 1 | 1 | 1 | 1 |
| DC193 | 1.5 | 1.5 | 1.5 | 1.5 | 1.5 | 1.5 |

TABLE 5-continued

| | Pentane-blown B2 continuous system using compositions based on F-3014 (mixed at 20° C.) | | | | | |
|---|---|---|---|---|---|---|
| Water | 2.49 | 2.49 | 2.49 | 2.49 | 2.49 | 2.49 |
| Pentane | 13.2 | 13.2 | 13.2 | 13.2 | 13.2 | 13.2 |
| Total | 145.19 | 145.19 | 145.19 | 145.19 | 147.19 | 145.19 |
| Isocyanate, g (Urestyl-10) | 178.64 | 169.51 | 163.66 | 171.26 | 166.98 | 178.03 |
| Mix time, sec | 6 | 6 | 6 | 6 | 6 | 6 |
| Cream time, sec | 12 | 12 | 12 | 12 | 12 | 12 |
| Gel time, sec | 38 | 35 | 34 | 34 | 34 | 37 |
| Tack free time, sec | 44 | 42 | 37 | 40 | 36 | 43 |
| Cure time, sec | 100 | 95 | 94 | 106 | 109 | 99 |
| Br content in polyol mixture, wt % | 7.5 | 9.6 | 9.6 | 11.7 | 11.5 | 8.8 |
| Br content in foam, wt % | 3.2 | 4.2 | 4.3 | 5.1 | 5.2 | 3.8 |
| Flame height, cm (DIN 4102) | 12.4 | 9.9 | 10.1 | 10.3 | 9.1 | 11.5 |

Examples 39-42

Liquid Flame-Retardant Compositions which Contain the Tribromophenol-Terminated Resins of Formula (1b)

Table 6 presents the ingredients of several liquid flame-retardant compositions of the present invention and stability tests carried out in respect thereto, which compositions are based on a flame retarding agent of Formula (1b), or a combination thereof with tribromoneopentyl alcohol. The compositions were obtained by mixing the ingredients at 70°-90° C. and subsequent cooling.

TABLE 6

| | | | Compositions based on F-3014 and/or F-3020 | | | | | | |
|---|---|---|---|---|---|---|---|---|---|
| Ex. | F-3014 wt % | F-3020 wt % | FR-513, wt % | C5710 wt % | Terol 516 wt % | R-4720 wt % | OH number | Br wt % | Stability months |
| 39 | 20 | — | 30 | — | 50 | — | 222 | 34 | 6 |
| 40 | 20 | — | 30 | — | — | 50 | 307 | 34 | 6 |
| 41 | — | 20 | 30 | 50 | — | — | 345 | 33 | 2 |
| 42 | 10 | 10 | 30 | 50 | | | 345 | 34 | 2 |

*The values given for the stability represent the length of time during which the compositions have been stored under ambient temperature conditions without the formation of a precipitate. The tests are continuing and thus the values given are not the limits of the stability.

Examples 43-46

Continuous System for Preparing Rigid Polyurethane Foams Using F-3014 and/or F-3020 Based Liquid Flame Retardant Compositions The compositions of Examples 39-42 were used for the preparation of rigid polyurethane foams according to the previously described procedures. Table 7 summarizes the ingredients and parameters for the foam preparation and the results of the testing of the foams.

TABLE 7

| | Pentane-blown B2 continuous system using compositions based on F-3014 and/or F-3020 (mixed at 20° C.) | | | |
|---|---|---|---|---|
| Composition, g | Example 43 | Example 44 | Example 45 | Example 46 |
| M530 | 30 | 30 | 30 | 30 |
| Terol 516 | 30 | 30 | 30 | 30 |
| Glycerol | 5 | 5 | 5 | 5 |
| FR of Example 39 F-3014/FR-513/Terol 516 20:30:50 | 37.2 | | | |
| FR of Example 40 F-3014/FR-513/R-4720 20:30:50 | | 37.5 | | |
| FR of Example 41 F-3020/FR-513/C5710 20:30:50 | | | 37.2 | |
| FR of Example 42 F-3014/F-3020/FR-513/ C5710 10:10:30:50 | | | | 37.2 |
| TCPP | 20 | 20 | 20 | 20 |

TABLE 7-continued

Pentane-blown B2 continuous system using
compositions based on F-3014 and/or F-3020 (mixed at 20° C.)

| Composition, g | Example 43 | Example 44 | Example 45 | Example 46 |
|---|---|---|---|---|
| TEP | 2.8 | 2.8 | 2.8 | 2.8 |
| DMCHA | 2 | 2 | 2 | 2 |
| AM58 | 1 | 1 | 1 | 1 |
| DC193 | 1.5 | 1.5 | 1.5 | 1.5 |
| Water | 2.49 | 2.49 | 2.49 | 2.49 |
| Pentane | 13.2 | 13.2 | 13.2 | 13.2 |
| Total | 145.19 | 145.19 | 145.19 | 145.19 |
| Isocyanate, g (Urestyl-10) | 161.92 | 170.64 | 174.54 | 174.54 |
| Mix time, sec | 6 | 6 | 6 | 6 |
| Cream time, sec | 12 | 14 | 14 | 13 |
| Gel time, sec | 31 | 36 | 36 | 37 |
| Tack free time, sec | 41 | 49 | 49 | 52 |
| Cure time, sec | 136 | 102 | 98 | 97 |
| Br content in polyol mixture | 9.6 | 9.6 | 9.3 | 9.6 |
| Br content in foam | 4.3 | 4.2 | 4.0 | 4.2 |
| Flame height, cm DIN 4102 | 11.6 | 11.7 | 11.7 | 11.9 |

Example 47

Comparative

Comparison of the Solubility of Various Flame Retardants

A structural analogue of tetrabromobisphenol A, which is tetrabromobisphenol S (wherein a sulfur bridge connects the two aromatic rings) was reacted with epichlorohydrin in iso-propanol, in order to obtain the analogues of the flame retardant of Formula 1a. The resulting reaction product, whose structure was confirmed by means of $^1$H NMR, has very poor solubility both in methyl isobutyl ketone and in mixtures of polyols and phosphate esters, and as a result it cannot be transformed into its end-capped derivatives (the analogues of Formula 1b) nor can it be easily delivered into the polyurethane foaming system.

Examples 48-49

Comparative

The composition according to Example 20, which is a solution of 20% F-3014 and 30% FR-513 in polyol C5710 (with a bromine content of 34%), was compared with a 50% solution of FR-513 in polyol C5710 (~37% bromine) in respect to their flame retarding efficacy in rigid polyurethane foams. To this end, the two compositions were incorporated in pentane-blown continuous foaming systems to give the foams as described in Table 8 below.

TABLE 8

Pentane-blown B2 continuous system using
compositions based on F-3014 (mixed at 20° C.)

| Composition, g | Example 48 | Example 49 |
|---|---|---|
| M530 | 30 | 30 |
| Terol 516 | 30 | 30 |
| Glycerol | 5 | 5 |

TABLE 8-continued

Pentane-blown B2 continuous system using
compositions based on F-3014 (mixed at 20° C.)

| Composition, g | Example 48 | Example 49 |
|---|---|---|
| FR of Example 20 F-3014/FR-513/C5710 20:30:50 | 37.2 | |
| FR-513/C5710 50:50 | | 37.2 |
| TCPP | 20 | 20 |
| TEP | 2.8 | 2.8 |
| DMCHA | 2 | 2 |
| AM58 | 1 | 1 |
| DC193 | 1.5 | 1.5 |
| Water | 2.49 | 2.49 |
| Pentane | 13.2 | 13.2 |
| Total | 145.19 | 145.19 |
| Isocyanate, g (Urestyl-10) | 174.54 | 177.26 |
| Mix time, sec | 6 | 6 |
| Cream time, sec | 14 | 15 |
| Gel time, sec | 37 | 36 |
| Tack free time, sec | 51 | 51 |
| Cure time, sec | 88 | 90 |
| Br content in polyol mixture | 9.6 | 10.4 |
| Br content in foam | 4.2 | 4.5 |
| Flame height, cm (DIN 4102) | 11.4 | 11.8 |

As can be seen from the data in Table 8, the composition of the invention shows better flame retardancy (flame height 11.4 cm) than the FR composition based on FR-513 only (flame height 11.8 cm) despite the fact that the bromine content in the second composition is higher.

The invention claimed is:
1. A liquid composition which comprises:
A) one or more solid flame retarding agents represented by Formula (1):

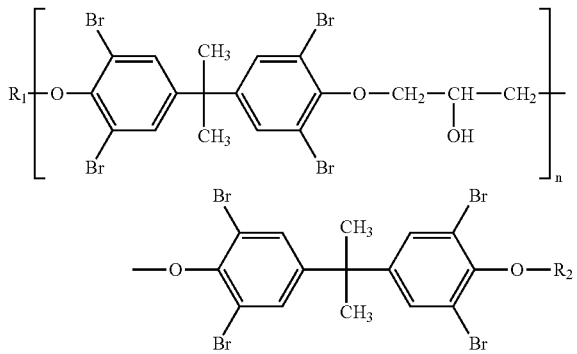

wherein n, the degree of polymerization, is an integer in the range of 0 to 5 and $R_1$ and $R_2$ are independently selected from the group consisting of the following monovalent radicals:

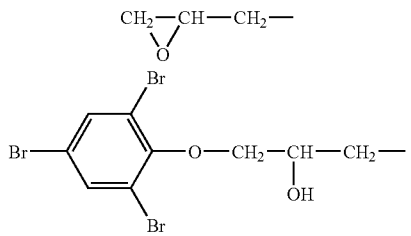

B) one or more liquids selected from the group consisting of polyols and esters of phosphoric acid, and C) tribromoneopentyl alcohol, said polyols comprise a polyol with a number of hydroxyl groups not less than 3 and a hydroxyl number in a range of 150 to 850 mg KOH/g, weight concentration of A) the one or more solid flame retarding agents represented by Formula (1) in the composition is between 10 and 60% w/w, (B) the one or more liquids in the composition is between 10 and 70% w/w and (C) the tribromoneopentyl alcohol is between 20 and 40% w/w, and the liquid composition is a solution in which (A) the one or more flame retarding agents of Formula (1) and (C) the tribromoneopentyl alcohol are dissolved in (B) the one or more liquids.

2. A liquid composition according to claim 1, wherein A) the one or more solid flame retarding agents is represented Formula (1'):

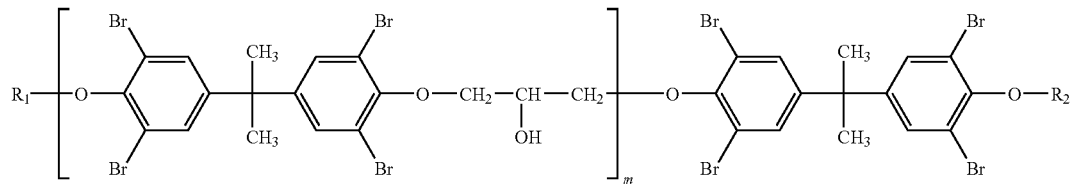

wherein m is the weight-average degree of polymerization, and is in the range between 0.05 to 1.0.

3. A liquid composition according to claim 1, wherein A) the one or more solid flame retarding agents includes at least one or more tribromophenol-terminated compounds represented by Formula (1b):

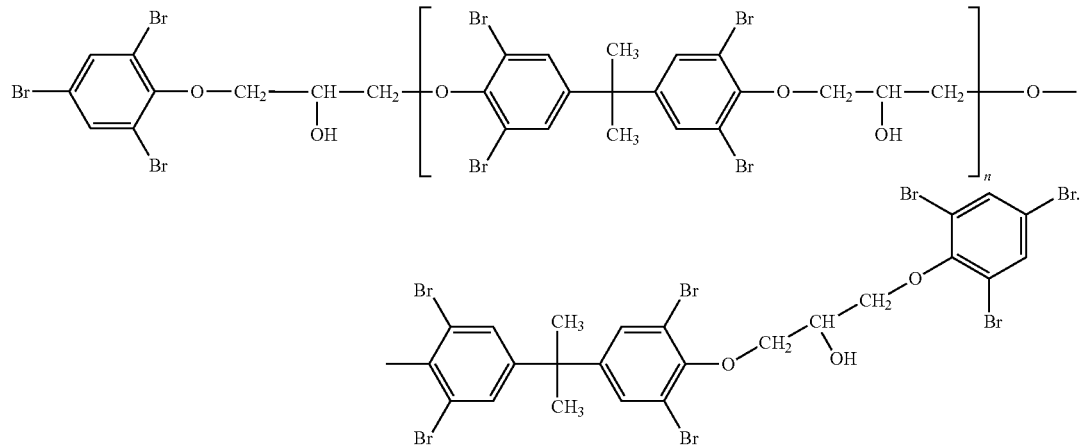

4. A liquid composition according to claim 3, wherein A) the one or more solid flame retarding agents is a mixture which comprises the tribromophenol-terminated compounds represented by Formula (1b) wherein n is 0, 1 or 2.

5. A liquid composition according to claim 4, wherein the weight concentrations of the one or more tribromophenol-terminated compounds represented by Formula (1b) wherein n is 0 or 1 are in the ranges of 55-70% and 20-35%, respectively, relative to the total weight of all tribromophenol-terminated compounds represented by Formula (1b) in the liquid composition.

6. A process which comprises:

providing a liquid composition as defined in claim 3, wherein

A) the one or more solid flame retarding agents represented by Formula (1) are dissolved in B) one or more liquids comprising one or more of the polyols and/or one or more of the esters of phosphoric acid; and mixing said liquid composition with one or more polyols and optionally with at least one blowing agent, at least one catalyst and at least one surfactant thereby affording a polyol component suitable for the preparation polyurethane or polyisocyanate foams, wherein the liquid composition is in the form of a solution.

7. A liquid composition according to claim 1, wherein the bromine concentration in the composition is not less than 25% w/w.

8. A liquid composition according to claim 1, wherein the liquid composition comprises a polyol which is a polyether-polyol.

9. A liquid composition according to claim 8, wherein the polyether-polyol is non-halogenated.

10. A liquid flame retardant composition according to claim 1, which is a solution comprising 20-40 by wt % of A) the one or more solid flame retarding agents represented by Formula (1) and B) one or more liquids selected from the group consisting of polyether-polyols and halogen-containing esters of phosphoric acid.

11. A liquid composition according to claim 10, wherein B) one more liquids comprises a halogen-containing ester of phosphoric acid which is tris (2-chloropropyl) phosphate.

12. A process for preparing the liquid composition of claim 1, which comprises heating A) the one or more solid flame retarding agents represented by Formula (1) together with B) one or more liquids selected from the group consisting of polyols and esters of phosphoric acid, until a clear solution is obtained, following which the liquid composition is cooled and stored until use.

13. A process, which comprises:
providing a liquid composition as defined in claim 1, wherein A) the one or more solid flame retarding agents represented by Formula (1) are dissolved in B) one or more liquids comprising one or more of the polyols and/or one or more of the esters of phosphoric acid; and
mixing said liquid composition with one or more polyols, and optionally with at least one blowing agent, at least one catalyst and at least one surfactant thereby affording a polyol component suitable for the preparation polyurethane or polyisocyanate foams.

14. A process according to claim 13, which further comprises reacting the polyol component with a diisocyanate component in the presence of at least one blowing agent, at least one catalyst, at least one surfactant and at least one phosphate ester to obtain a rigid polyurethane or polyisocyanate foam.

15. A process according to claim 13, which is carried out on-site at the environmental temperature at the working site.

16. A composition according to claim 1, comprising an ester of phosphoric acid.

17. A liquid composition according to claim 16, wherein the ester of phosphoric acid is substituted with halogen atoms.

18. A liquid composition according to claim 17, wherein the ester of phosphoric acid is tris (2-chloropropyl)phosphate.

19. A liquid composition according to claim 1, wherein the weight concentration of A) the one or more solid flame retarding agents represented by Formula (1) in the composition is between 20 and 45% w/w and B) one or more liquids in the composition is between 20 and 60% w/w.

* * * * *